W. F. WOOLSEY.
Furnace for Destroying Insects.
No. 167,722. Patented Sep't. 14, 1875.
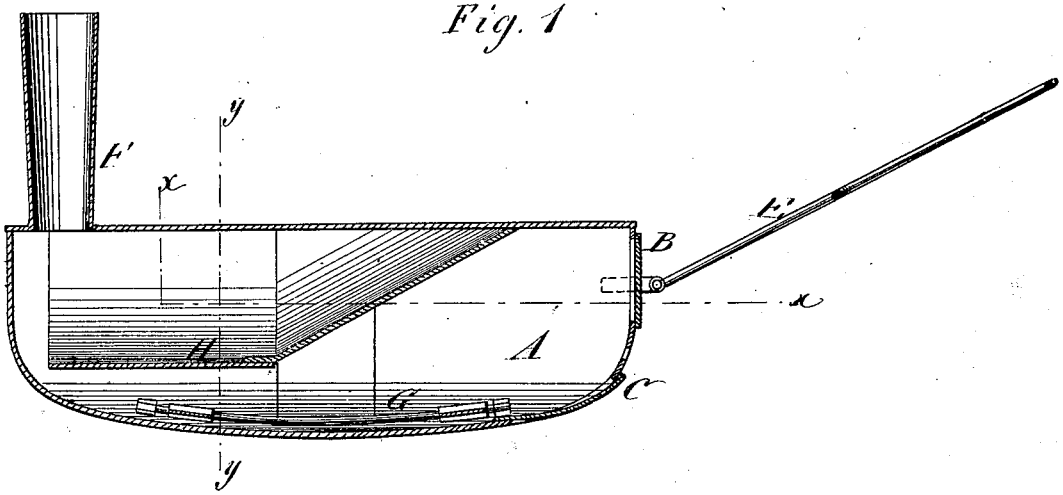
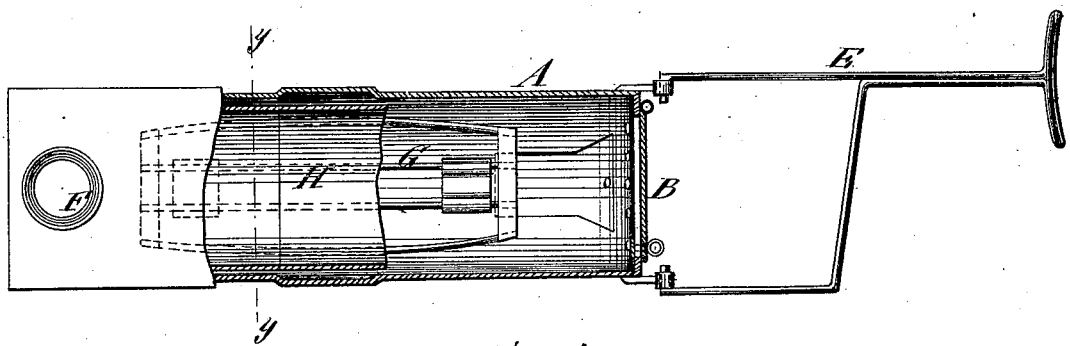
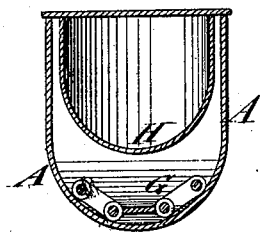
WITNESSES:
C. Neveux
Alex F. Roberts
INVENTOR:
W. F. Woolsey
BY
ATTORNEYS.

UNITED STATES PATENT OFFICE.

WILLIAM F. WOOLSEY, OF BRECKENRIDGE, MISSOURI.

IMPROVEMENT IN FURNACES FOR DESTROYING INSECTS.

Specification forming part of Letters Patent No. 167,722, dated September 14, 1875; application filed January 16, 1875.

*To all whom it may concern:*

Be it known that I, WILLIAM F. WOOLSEY, of Breckenridge, in the county of Caldwell and State of Missouri, have invented a new and Improved Method of Destroying Insects, of which the following is a specification:

My improved method of destroying insects consists of burning them with a heated furnace in a furrow plowed in the ground around the field from which the insects seek to escape, the furnace being drawn while heated along the furrow, in which the insects have been arrested in their escape by the furrow being contrived, in form and condition of its surface, so that they cannot get out after getting in. The furnace consists of a little boat-shaped sheet-metal contrivance formed in cross-section to correspond with the form of the furrow, and provided with a fire-grate, draft and escape passages, and also with a deflector in the upper and middle portion to cause the heat to act on the sides, so as to throw it off upon the sides and bottom of the furrow to the best advantage as the furnace is drawn along the furrow.

Figure 1 is a longitudinal sectional elevation of a furnace such as I propose to use. Fig. 2 is partly a plan view and partly a horizontal section. Fig. 3 is a cross-section.

Similar letters of reference indicate corresponding parts.

In the early spring the insects congregate in the early growing crops, such as wheat, oats, and barley, and there deposit their eggs, which are soon hatched, producing hosts of wingless insects, which are soon compelled to migrate to other crops for subsistence in consequence of the early harvesting or destruction of the above-named early crops. In this migration I propose to destroy them by heat in the following manner: Around any piece of grain plow, a day or two before cutting the grain, two or three furrows with a turning-plow, to the depth of ten or twelve inches, following the plow with a log of wood, and continue it until the surface of the furrows is thoroughly pulverized. When the insects, leaving the field of cut or destroyed grain, congregate in these furrows, which they do in consequence of being unable to climb up the pulverized banks, draw the furnace well heated by fire within along the furrow. The furnace should be made to correspond in cross-section with the form of the furrow, so that the hot sides will be brought into close contact with the insects; and the sides, or the lower portions of them, and the bottom, should be convex, so that they will only touch the sides and bottom of the furrow along a short portion of the middle, by which the heat will not be conducted away by the earth so fast as if the whole length rested on the earth.

In the drawing, A represents an oblong hollow shell, of sheet metal, with a fuel-door, B, an ash-door, C, and a tongue, E, at the front end; a smoke-pipe, F, at the rear end, and containing a grate, G, and a deflector, H, all being suitably contrived and arranged for drawing along the furrows and burning the insects on the bottom and sides in the manner above described, the furnace being heated by light rapidly-burning fuel as it is drawn along.

Having thus described my invention, I claim as new and desire to secure by Letters Patent—

The improved insect-destroying furnace herein described, being an oblong hollow metal case, adapted in shape to the shape of the furrow in cross-section, and provided with ash-doors, grate, smoke-pipe, and a tongue, all substantially as specified.

WILLIAM F. WOOLSEY.

Witnesses:
 FRANK H. BRADEN,
 EPHRAIM H. NEFF.